though which the shaft of roller *i* projects.

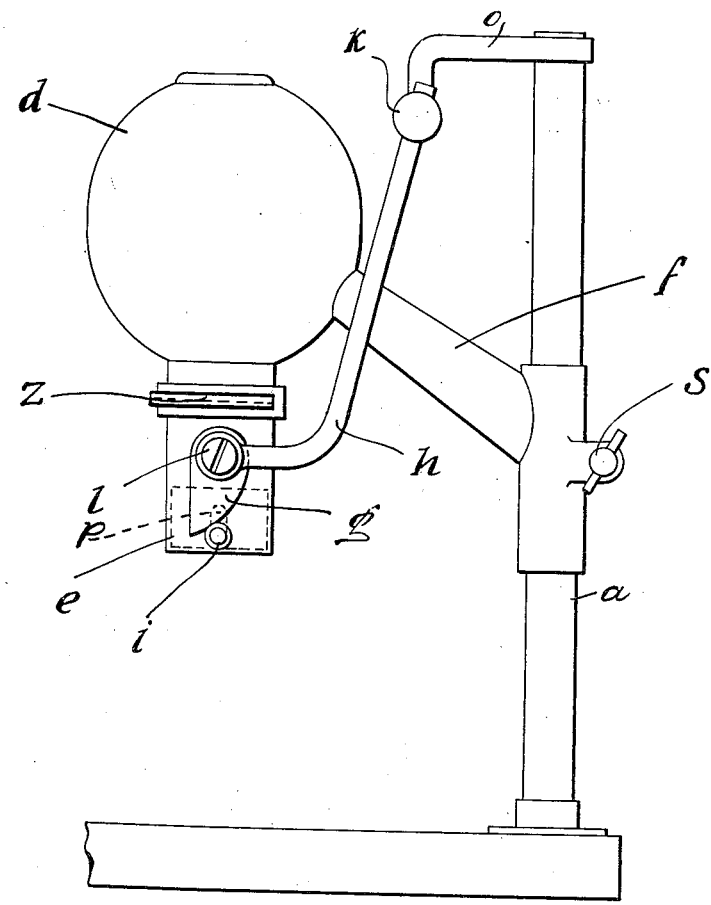

UNITED STATES PATENT OFFICE 2,055,236

PHOTOGRAPHIC ENLARGEMENT APPARATUS

Walter Klatt, Feuerbach, near Stuttgart, Germany, assignor to Ernst Leitz Optische Werke, Wetzlar, Germany Original application July 29, 1933, Serial No. 682,780. Divided and this application February 17, 1934, Serial No. 711,690

1 Claim. (Cl. 88—24)

This invention relates to improvements in photographic enlargement apparatus, as for instance described in my co-pending application Serial No. 682,780, filed July 29, 1933, of which this application is a division, and it is the principal object of my invention to provide such an apparatus with a cam controlled automatic regulation of the objective to the sharpest focus.

The object of the present invention is to provide an enlargement camera for small negatives with means for automatically focusing the camera objective, including a system of levers pivotally connected to the objective setting while a roller displaceable relatively to said setting and a cam operating by a lever arm of said system operates the roller to focus the objective.

These and other objects and advantages of my invention will become more fully known as the description thereof proceeds, and will then be more specifically defined in the appended claim.

In the accompanying drawing forming a material part of this disclosure:

The single figure on the drawing illustrates in side elevation the preferred form of my apparatus constructed according to my invention.

As illustrated, the enlargement apparatus is arranged on a stationary arm *f* vertically displaceable on standard *a* and can be locked in any of its adjusted positions by means of the locking device *s*. The swinging arm *h* is adjustably arranged in a guide *k* suitably held to the end of an arm *o* attached to the upper end of standard *a* and can be rotated therein, and moves the cam *g* engaging roller *i* or another projection on the objective setting not illustrated as it is of well known construction and telescoping within housing *e*, so that the objective connected therewith is suitably adjusted as the roller *i* or other projection of the objective setting is vertically displaceable in a slot *p* in housing *e* through which the shaft of roller *i* projects.

The lower end of arm *h* is pivoted, as at *l* similar to the arrangement in the lever arm parallelogram *b* and *c* of Figures 1 and 2, of my co-pending application, pivoted at *o* and *p* respectively to standard *a*.

The base board *t* is used as support for the sensitive paper and the slot *z* serves for the introduction of the negative into the enlargement apparatus below the lamp casing.

In operation, the cam *g* under the influence of the movement of the lever arms *h* and *f* will engage the roller *i*, the spindle pin of which is guided in the slot *p* of the objective setting to focus the same for the correct enlargement of a small film negative on a support according to the angular positions of the lever arm aggregate.

It will be understood that I have described and shown the preferred form of my invention as one example of the many possible ways to practically construct my invention, and that I may make such changes in the general arrangement and in the construction of the minor details of my invention as come within the scope of the appended claim without departure from the spirit of my invention and the principles involved.

Having thus described my invention what I claim as new and desire to secure by Letters Patent is:

In an enlargement camera for small negatives, a means for automatically focusing the camera objective, said means comprising a standard, a rigid arm vertically adjustable on said standard, an arm on said standard carrying a guide, a lever arm displaceably and rotatably held in said guide, and pivotally connected to the slotted housing of the objective setting, a roller on a spindle displaceable relatively to said setting projecting through the slot in said housing and a cam operated by said lever to operate said roller to focus the objective.

WALTER KLATT.